(12) United States Patent
Bergman et al.

(10) Patent No.: US 8,408,567 B2
(45) Date of Patent: Apr. 2, 2013

(54) SWATHER TRACTOR WITH FRAME SUSPENSION

(75) Inventors: Leonard Bergman, Winnipeg (CA); James Thomas Dunn, Winnipeg (CA)

(73) Assignee: MacDon Industries Ltd, Winnipeg, MB (CA)

( * ) Notice: Subject to any disclaimer, the term of this patent is extended or adjusted under 35 U.S.C. 154(b) by 128 days.

(21) Appl. No.: 13/100,867

(22) Filed: May 4, 2011

(65) Prior Publication Data
US 2011/0272198 A1 Nov. 10, 2011

Related U.S. Application Data

(60) Provisional application No. 61/332,858, filed on May 10, 2010.

(51) Int. Cl.
*A01D 34/03* (2006.01)

(52) U.S. Cl. ... 280/124.116; 280/124.111; 280/124.157; 180/900; 180/6.2; 56/14.7

(58) Field of Classification Search ............... 180/6.2, 180/6.48, 6.5, 6.64, 900; 280/124.157, 124.111, 280/124.125, 124.116, 124.128; 56/14.7
See application file for complete search history.

(56) References Cited

U.S. PATENT DOCUMENTS

| | | | | |
|---|---|---|---|---|
| 3,959,957 A | * | 6/1976 | Halls | 56/208 |
| 4,724,661 A | * | 2/1988 | Blakeslee et al. | 56/208 |
| 2007/0214760 A1 | * | 9/2007 | Bomleny et al. | 56/10.2 E |
| 2010/0230182 A1 | * | 9/2010 | Otto | 180/6.48 |

* cited by examiner

*Primary Examiner* — Ruth Ilan
(74) *Attorney, Agent, or Firm* — Adrian D. Battison; Ade & Company Inc.

(57) ABSTRACT

A swather tractor has a frame defined by a main tractor frame carrying the cab, engine and drive system, rear axle with castor wheels and a transverse front frame assembly mounted at a front of the main frame. The front rigid frame assembly carries the header and comprises a cross member and a pair of upstanding legs each carrying a front ground wheel hydraulically driven so that steering is controlled by the rate of forward movement of the front wheels. In order to provide improved suspension, the main frame is connected to the front frame assembly by a coupling which allows up and down suspension movement of the main frame relative to the front frame assembly.

13 Claims, 2 Drawing Sheets

SWATHER TRACTOR WITH FRAME SUSPENSION

This application claims the benefit under 35 USC 119 of Provisional Application 61/332858 filed May 10, 2010.

This invention relates to a swather tractor with a frame suspension arrangement to provide an improved ride of the tractor in rough terrain.

BACKGROUND OF THE INVENTION

Typical swather tractors include a frame which carries a cab and engine with a transverse frame assembly which carries on each of a pair of depending frame leg a respective one of a pair of driven wheels. The transverse frame assembly also carries a pair of lift arms each for supporting a header of the tractor to be moved in front of the tractor for crop harvesting.

At the rear of the frame is a transverse rear axle assembly which carries a pair of rear wheels. The rear wheels are castor wheels with a vertical castor shaft pivotal around a vertical axis at the respective end of the axle assembly and a single wheel mounted on a hub offset from the vertical axis so that the wheel hub defines a horizontal rotation axis for the wheel which is located at a position trailing the vertical castor axis.

The castor wheel is allowed to rotate freely and the steering for the tractor is provided by a differential in drive speed between the drive wheels so that the castor wheels merely follow the movement generated by the drive wheels and the frame.

Suspension for the rear wheels in some designs is provide merely by mounting the rear axle on a center horizontal pivot which allows the rear axle to pivot side so side as the ground level changes. Although in some more recent designs attempts have been made to improve suspension at the rear by splitting the rear axle into two parts each extending to a respective side and each pivotal about a respective pivot axis so that the outer ends of the parts can pivot upwardly and downwardly relative to the frame and independently of the other part. A gas bag suspension and shock absorber is provided between the axle part and the frame. The conventional castor wheel is mounted at the end of the axle part.

This arrangement of the castor wheel has been used for many years and is accepted as the standard arrangement for this type of tractor. One advantage of the system is that it makes the tractor very maneuverable and allows the tractor in effect to turn around a center point with the castor wheels turning at right angles to the center line of the tractor. In some cases also it allows the tractor to be reversed in direction for transport with the castor wheels turning through 180 degrees. Thus the castor wheels must be freely turnable to follow the direction of travel and must be free to rotate fully around the vertical castor axis. The terms "front" and "rear" used herein therefore refer for convenience to the direction of movement during harvesting.

Due to increases on operating speed both in the field and in transport, more attention is being given to improving the ride quality and to reduce loadings on the frame which can lead to structural damage if the frame is insufficiently robust.

Windrower (or swather) tractors are inherently quite rough to ride on. Cab suspension and rear walking beam suspension have been used to improve on ride but it would be desirable to also isolate the frame of the propulsion unit from shock so as to reduce stress in the frame members. The problem with a windrower is that it carries a variety of headers of different weights and sizes, making suspension tuning difficult.

SUMMARY OF THE INVENTION

It is one object of the present invention to provide a swather tractor of the above general type which includes a suspension arrangement which can improve the ride of the frame of the tractor over the field.

According to the invention there is provided a swather tractor comprising:

a tractor frame;

a cab, an engine and a drive system mounted on the frame;

a transverse front frame assembly mounted at a front of the frame;

a transverse rear axle assembly;

the rear axle assembly having a pair of rear castor wheels each mounted at a respective end of the rear axle assembly;

the front frame assembly comprising a cross member having at each end a respective one of a pair of upstanding legs;

each leg carrying at a lower end thereof respective one of a pair of front ground wheels for supporting the tractor;

each of the front ground wheels being driven by the drive system for powering forward motion of the tractor over the ground;

the front frame assembly carrying a header support system including a pair of lift arms arranged for supporting a header in front of the front wheels;

the tractor frame being connected to the front frame assembly by a coupling which allows suspension movement of the tractor frame relative to the front frame assembly.

This arrangement therefore has the drive wheels and header on a sub-frame, allowing the wheels to carry the varying widths/weights of headers without going through the suspension. The main propulsion unit frame is attached to the wheel sub-frame by two parallel links that allow the weight of the header to be transferred to the propulsion unit main frame to counter-balance the header. These parallel links are in a substantially horizontal plane so that they cannot transmit any vertical loads one way or the other. The weight of the main frame is taken up by an air bag, mechanical spring or hydraulic cylinder between the main frame and the wheel sub-frame. The main frame carries the cab (with or without cab suspension) and is supported at the rear by casters on a walking beam, which also may or may not have suspension.

Preferably the movement is substantially vertical.

Preferably the main frame includes a pair of parallel beams at respective sides of the main frame and a pair of depending legs each at a forward end of a respective one of the beams.

Preferably the main frame includes a pair of legs each arranged adjacent to a respective one of the legs of the front frame assembly and wherein the coupling comprises respective coupling portions between one of the legs of the frame and its adjacent leg of the front frame assembly.

Preferably the coupling portion comprises a pair of parallel links which are arranged substantially horizontally so as to define substantially vertical suspension movement.

Preferably the coupling includes a gas bag spring.

Preferably the gas bag spring is located between a bottom of the leg of the main frame and a support at the bottom of the leg of the front frame assembly.

Preferably the coupling includes a shock absorber.

Preferably the cab is suspended relative to the main frame.

Preferably the front frame assembly is rigid so that the front wheels are fixed without suspension movement relative to the front frame assembly.

Preferably the header is free to float relative to the front frame assembly.

The arrangement described herein can therefore allow for a relatively light suspension that carries a consistent weight, that is it does not have to accommodate varying size/weights of headers. The suspension can be tuned by design the same for all machines without need for adjustment when different headers are installed.

DETAILED DESCRIPTION

Figure 1:
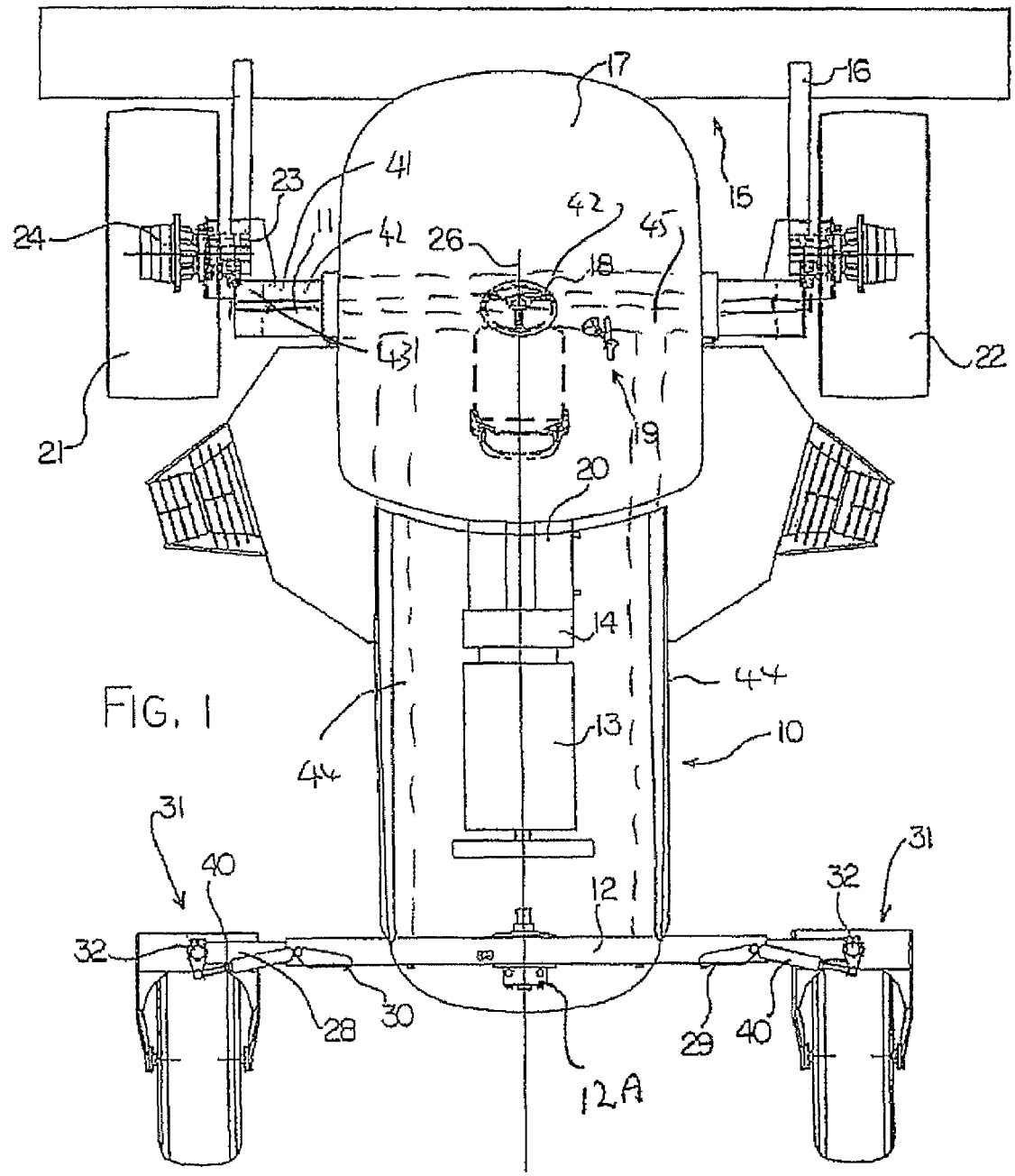
FIG. 1 is a top plan view showing schematically a swather tractor of the type with which the present invention is concerned.

In FIG. 1 is shown a tractor of the above type which includes a frame 10 with a front axle 11 and a rear axle 12. On the frame 10 is mounted a motor 13 driving a gear box and pump assembly schematically indicated at 14 for communicating hydraulic drive fluid to the various components of the tractor for propelling the tractor and for driving an implement 15 mounted on the tractor. In one example, the engine drives a gearbox at the rear of the engine that splits the power to two pump assemblies. One pump assembly has two pumps (one for each wheel) for traction drive and each pump controls one wheel. The other pump assembly has four pumps (two for header drive, one for lift functions and one providing supercharge oil). In the embodiment shown the implement is a header arranged for cutting a standing crop with the header carried on support arms 16 mounted on the tractor at the forward end in conventional manner. The tractor includes a cab 17 including steering 18 and control elements 19 operable by the driver with those control elements and steering acting to communicate control movements to a fluid control system generally indicated at 20 which supplies the fluid to the various elements to be driven.

The tractor includes first wheels 21 and 22 mounted on legs 23 extending downwardly from the front axle 11. Each leg carries a drive motor 24 for providing drive power to the respective wheel 21, 22 in response to the supply of hydraulic fluid from the control unit 20. The wheels 21 and 22 are mounted on hubs attached to the motors 24 so that the wheels are supported at a fixed angle to the frame so as to be parallel to each other and parallel to a center line 26 of the tractor. Thus the tractor is not steered by pivotal movements of the wheels which are fixed.

The rear axle 12 carries adjustable portions 28 and 29 which can be moved inwardly and locked by connecting bolts 30 at a required spacing from the center line 26 thus allowing adjustment of the track of the vehicle outwardly. The beam also can be non-adjustable and this invention will work equally as well on it. The rear axle is mounted for pivotal movement on a center pivot 12A defining a horizontal axis longitudinal of the center line of the tractor so as to form what is commonly known as a walking beam. At the outer end of each portion 28, 29 is mounted a respective castor wheel 31 which can swivel around a vertical pivot member 32 of the castor. Thus the wheels on the axle 12 are castor wheels which are again not steered but merely free to rotate around the vertical axis defined by the pivot 32.

Tractors of this type are well known and are highly maneuverable since the steering is effected by differential speed or differential rotation of the wheels 21 and 22 with the castor wheels 31 merely following the steering action as required. It is well known that such tractors are generally used with the driven wheels 21 and 22 forward so that the implement is in front of those wheels.

However for high speed movement the vehicle is driven in the opposite direction so that the driven wheels 21 and 22 are at the rear and the castor wheels are at the front. This is known to provide an improved stability of the tractor at higher transport speeds and may provide an improved arrangement.

Figure 2:
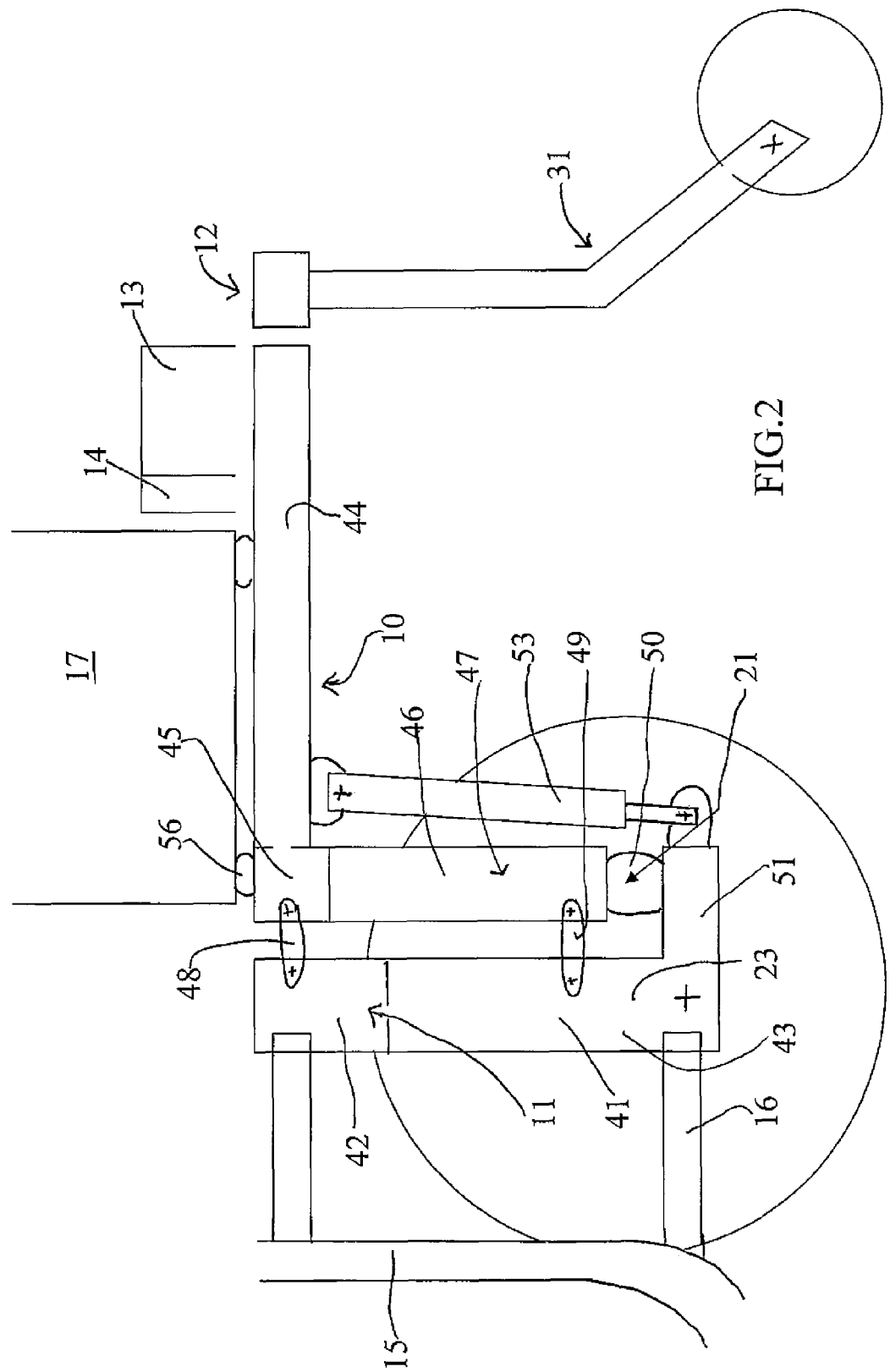
FIG. 2 is a side elevational view of the tractor of FIG. 1 showing the frame suspension in more detail.

Turning now to FIG. 2, the front axle in this arrangement is formed as a separate transverse front frame assembly 41 mounted at the front of the frame. The front frame assembly 41 comprising a cross member 42 having at each end a respective one of a pair of upstanding legs 43 with each leg carrying at its lower end thereof respective one of a pair of front ground wheels 21 and 22 for supporting the tractor.

The tractor frame 10 comprises a pair of parallel beams 44 and a front cross member 45. The cross member 45 carries a pair of depending legs 46 at positions spaced so as to locate immediately adjacent the legs 43 and just behind the legs 43. The legs 46 are each connected to a respective one of the legs 43 by a coupling 47 which allows suspension movement of the frame relative to the front frame assembly.

The coupling portion 47 comprises a pair of generally horizontal parallel links 48 and 49 pivotally connected at the front end to the leg 43 and at a rear end to the led 46. This confines the relative movement of the legs 43 and 46 to substantially vertical movement. A gas bag spring 50 is located between a bottom of the leg 46 of the main frame and a rearwardly extending support portion 51 attached at the bottom of the leg 43 of the front frame assembly this resists the vertical movement of the leg 46 downwardly relative to the leg 43. The coupling further includes a shock absorber 53 suitably coupled between the frame 10 and the front frame assembly 41 and as shown between the beam 44 and the portion 51.

The cab 17 is mounted in a spring suspension system 56 suspended relative to the main frame.

The front frame assembly including the cross beam 42 and the legs 43 are rigid so that the front wheels 21 are fixed without suspension movement relative to the front frame assembly. This ensures that the header floats on the arms 16 relative to a fixed frame which is at a constant height relative to the ground. However the frame carrying the cab and motive systems is free to float upwardly and downwardly relative to the fixed front frame assembly to accommodate upward and downward movement of the front frame assembly as the ground height changes.

The invention claimed is:
1. A swather tractor comprising:
a tractor frame;
a cab, an engine and a drive system mounted on the frame;
a transverse front frame assembly mounted at a front of the frame;
a transverse rear axle assembly;
the rear axle assembly having a pair of rear castor wheels each mounted at a respective end of the rear axle assembly;
the front frame assembly comprising a cross member having at each end a respective one of a pair of upstanding legs;
each leg carrying at a lower end thereof respective one of a pair of front ground wheels for supporting the tractor;
each of the front ground wheels being driven by the drive system for powering forward motion of the tractor over the ground;
the front frame assembly carrying a header support system including a pair of lift arms arranged for supporting a header in front of the front wheels;

the tractor frame being connected to the front frame assembly by a coupling which allows suspension movement of the tractor frame relative to the front frame assembly.

2. The swather tractor according to claim 1 wherein the coupling is arranged such that the suspension movement is substantially vertical.

3. The swather tractor according to claim 1 wherein the tractor frame includes a pair of parallel beams at respective sides of the tractor frame and a pair of depending legs each at a forward end of a respective one of the beams.

4. The swather tractor according to claim 1 wherein the tractor frame includes a pair of legs each arranged adjacent to a respective one of the legs of the front frame assembly and wherein the coupling comprises respective coupling portions between one of the legs of the tractor frame and its adjacent leg of the front frame assembly.

5. The swather tractor according to claim 1 wherein the coupling portion comprises a pair of parallel links.

6. The swather tractor according to claim 4 wherein the coupling portion comprises a pair of parallel links.

7. The swather tractor according to claim 1 wherein the coupling includes a gas bag spring.

8. The swather tractor according to claim 4 wherein the coupling includes a gas bag spring which is located between a bottom of the leg of the main frame and a support at the bottom of the leg of the front frame assembly.

9. The swather tractor according to claim 1 wherein the coupling includes a shock absorber.

10. The swather tractor according to claim 1 wherein the cab is mounted on the tractor frame by a suspension arrangement providing suspension movement between the cab and the tractor frame.

11. The swather tractor according to claim 1 wherein the front frame assembly is rigid and the front wheels are fixed without suspension movement relative to the front frame assembly.

12. The swather tractor according to claim 1 wherein the header support system is arranged to allow the header to float relative to the front frame assembly.

13. The swather tractor according to claim 1 wherein the castor wheels are allowed to castor freely and the steering for the tractor is provided by a differential in drive speed between the front wheels.

* * * * *